United States Patent
Jeppsson

(10) Patent No.: US 7,658,272 B2
(45) Date of Patent: Feb. 9, 2010

(54) APPARATUS FOR REMOVING OBJECTS ADVANCED ON A CONVEYOR

(75) Inventor: Roger Jeppsson, Landskrona (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 134 days.

(21) Appl. No.: 11/791,655

(22) PCT Filed: Nov. 25, 2005

(86) PCT No.: PCT/SE2005/001774

§ 371 (c)(1),
(2), (4) Date: Mar. 12, 2008

(87) PCT Pub. No.: WO2006/059944

PCT Pub. Date: Jun. 8, 2006

(65) Prior Publication Data

US 2009/0038915 A1    Feb. 12, 2009

(30) Foreign Application Priority Data

Nov. 30, 2004   (SE) .................................... 0402905

(51) Int. Cl.
B65G 47/34 (2006.01)
(52) U.S. Cl. ................................. 198/370.07
(58) Field of Classification Search ............ 198/370.07, 198/367, 416, 417, 429, 430
See application file for complete search history.

(56) References Cited

U.S. PATENT DOCUMENTS

| | | | | |
|---|---|---|---|---|
| 3,246,733 A | * | 4/1966 | Torbet et al. ........... | 198/370.07 |
| 4,147,248 A | * | 4/1979 | Kurczak et al. ............. | 198/358 |
| 4,193,486 A | | 3/1980 | Borzym et al. | |
| 4,771,876 A | * | 9/1988 | Bandixen ..................... | 198/367 |
| 5,454,465 A | * | 10/1995 | Baranowski ................ | 198/429 |
| 5,464,088 A | * | 11/1995 | Koerber ................. | 198/370.07 |
| 5,868,239 A | | 2/1999 | Bonnet | |
| 6,220,421 B1 | * | 4/2001 | Hugon et al. .......... | 198/370.07 |
| 6,688,459 B1 | * | 2/2004 | Bonham et al. ............. | 198/617 |

FOREIGN PATENT DOCUMENTS

| | | |
|---|---|---|
| EP | 1422173 A1 | 5/2004 |
| GB | 1100770 A | 1/1968 |
| SE | 436022 B | 11/1984 |

OTHER PUBLICATIONS

International Search Report.

\* cited by examiner

Primary Examiner—Mark A Deuble
(74) Attorney, Agent, or Firm—Buchanan Ingersoll & Rooney PC

(57) ABSTRACT

The invention relates to an apparatus for removing objects (1) which are advanced on a conveyor (2). The apparatus comprises a part of the conveyor (2) on which the objects (1) are advanced and supports (12) for the objects (1) removed from the conveyor (2). The apparatus also includes a pivotal cradle (13) which is placed over the conveyor (2). The pivotal cradle (13) has two through flow channels (8) each with an inlet (5) and an outlet (6). The pivotal cradle (13) is also provided with a stop (9) pivotal between the outlets (6) of the two through flow channels (8).

8 Claims, 3 Drawing Sheets

APPARATUS FOR REMOVING OBJECTS ADVANCED ON A CONVEYOR

TECHNICAL FIELD

The present invention relates to an apparatus for removing objects advanced on a conveyor, the apparatus comprising a part of a conveyor on which the objects are advanced, as well as supports for the removed objects.

BACKGROUND ART

Many industries employ conveyors for conveying objects between different production stations or between a production station and distribution equipment. Conveyors also occur to a considerable extent within the industry that packs liquid foods in single-use disposable packages. The single-use disposable packages are often manufactured from a packaging laminate containing paperboard with various plastic layers. The single-use disposable packages may, for example, be of parallelepipedic configuration, but they may also be of the gable top type.

The parallelepipedic packages are produced from a continuous web of packaging material. The material web is formed into a tube, in which the product is filled whereafter the material tube is sealed transversely and severed into individual packages. The individual packages are finally formed and thereafter leave the filling machine on a conveyor. The transverse sealing into individual packages often takes place with the aid of a number of transverse sealing jaws which are mounted on a chain.

The industry which packs liquid foods often needs to remove a number of packages from the long row of filled packages departing from the filling machine. For example, it may be desirable to remove one package from each transverse sealing jaw. By taking such samples at uniform intervals, it is possible rapidly to trace possible errors or damage to the filling machine. It is then necessary to be able to remove the packages rapidly and without damaging the removed packages or the packages remaining in place on the conveyor. The intention is also to maintain the packages in the correct number and in the correct sequence. Naturally, there may also be other reasons for removing objects from a conveyor.

Use has previously been made of blow nozzles which have blown off the selected packages from the conveyor in onto one or more lateral supports. But as the filling machines have become increasingly more rapid the demands have also increased on being able to remove a number of packages rapidly and without disturbing the packages which remain on the conveyor.

Modern filling machines may have an output capacity of 15,000 packages per hour. Apparatuses and devices which retard the objects on the conveyor when the selected objects are to be removed can, for such rapid machines, cause a tailback pressure which is so great that the objects, i.e. the packages, which are left on the conveyor are deformed.

OBJECTS OF THE INVENTION

One object of the present invention is to realise an apparatus which, in a rapid and simple manner, removes a number of predetermined objects in the correct sequence from a long row of objects being advanced on a conveyor.

A further object of the present invention is that the apparatus be simple and economically manufactured. It also contains few moving parts for which reason the costs for spare parts are slight.

A further object of the present invention is that the apparatus will operate in such a manner that a minimum tailback pressure is created on removal.

SOLUTION

These and further objects have been attained according to the present invention in that the apparatus of the type described by way of introduction has been given the characterising feature that the apparatus also includes a cradle pivotal over the conveyor with two through flow channels each having an inlet and an outlet, as well as a stop which is pivotal between the outlets of the two through flow channels.

Preferred embodiments of the present invention have further been given the characterising features as set forth in the appended subclaims.

BRIEF DESCRIPTION OF THE ACCOMPANYING DRAWINGS

The present invention will now be described in greater detail hereinbelow, with reference to the accompanying Drawings. In the accompanying Drawings.

The accompanying Drawings show only those parts and details essential to an understanding of the present invention, and the positioning of the apparatus in relation to other machine equipment has been omitted.

DESCRIPTION OF PREFERRED EMBODIMENT

Figure 1:
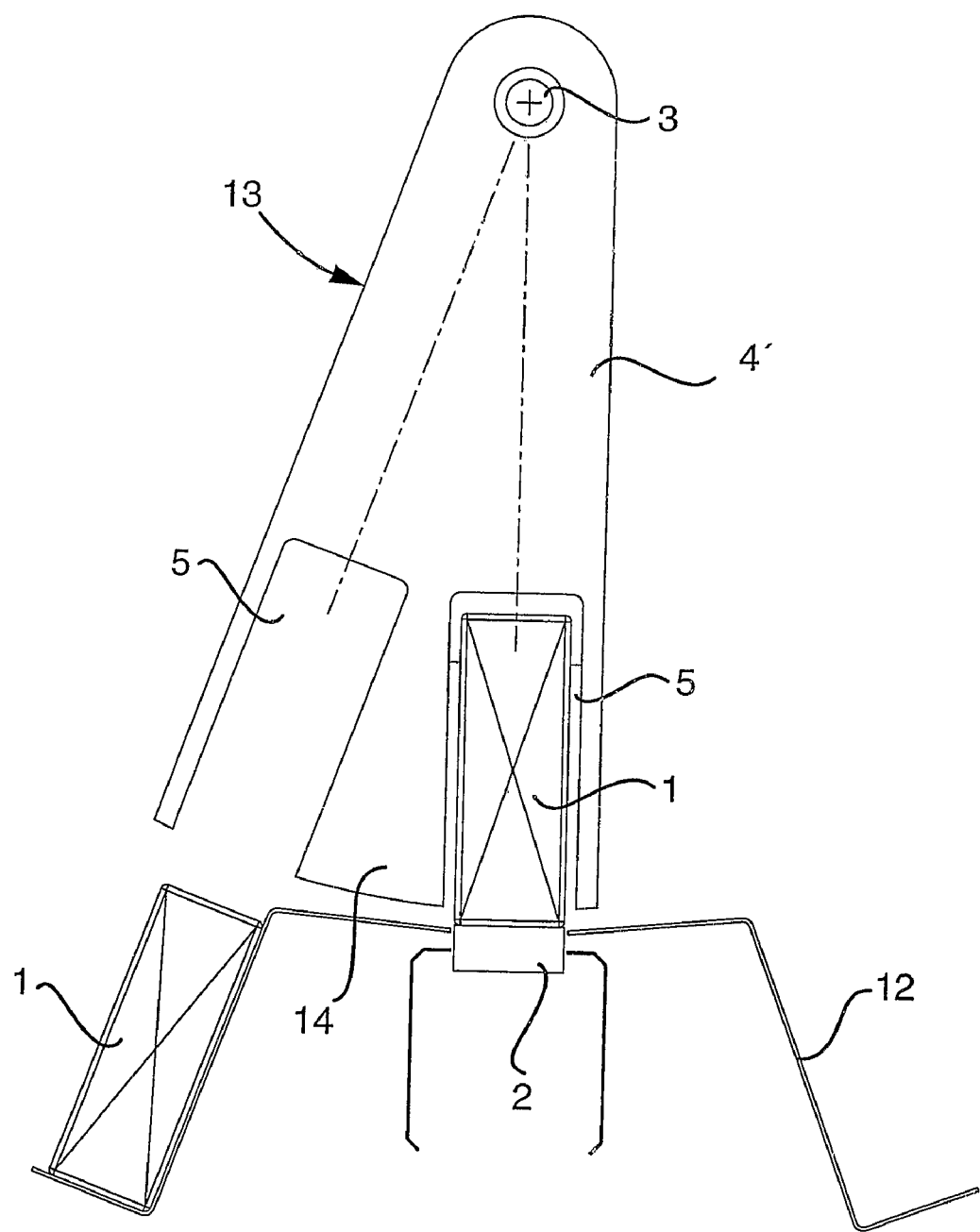
FIG. 1 is a side elevation of the apparatus in the direction of movement of the conveyor.
Figure 2:
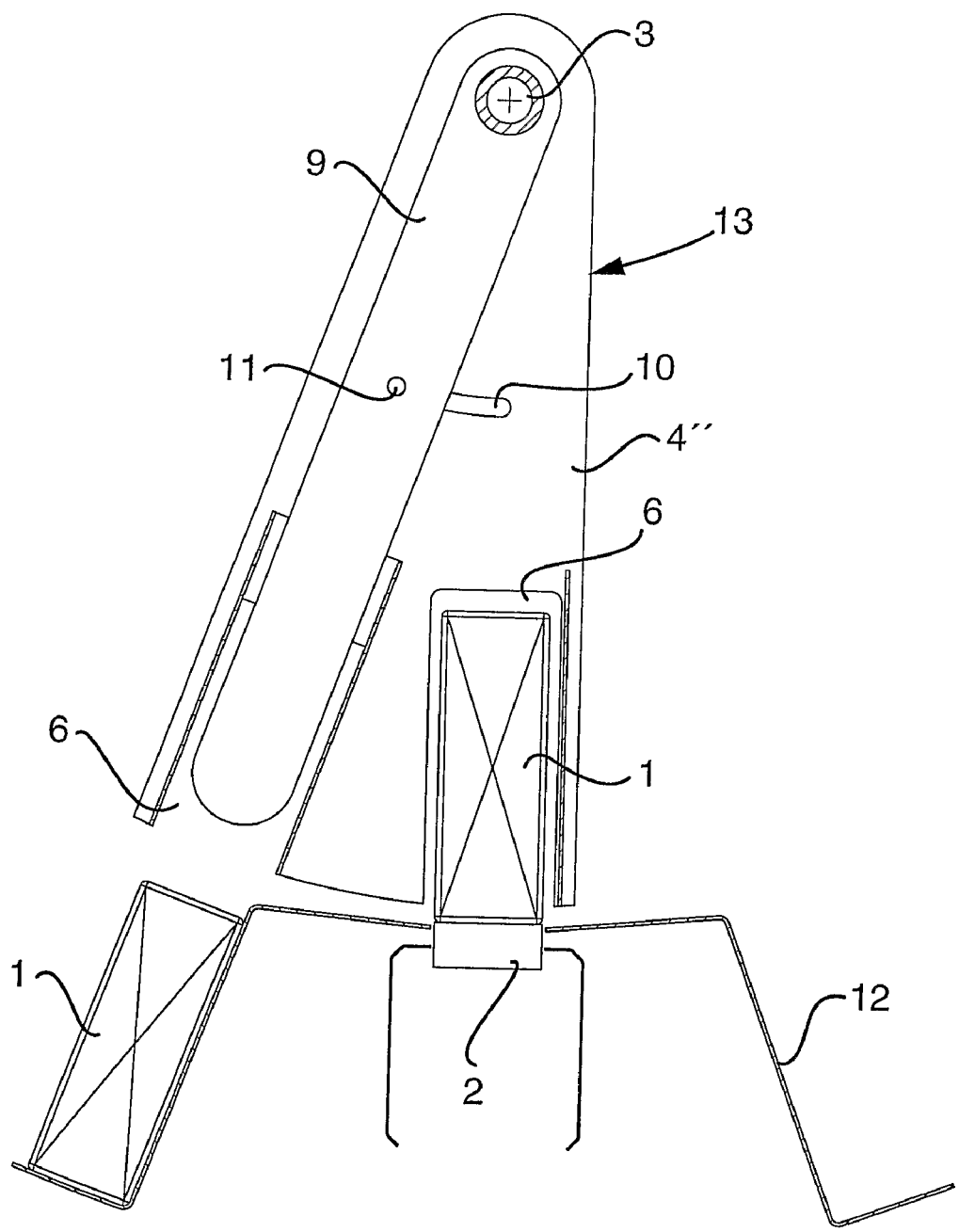
FIG. 2 is a side elevation of the apparatus facing towards the direction of movement of the conveyor.
Figure 3:
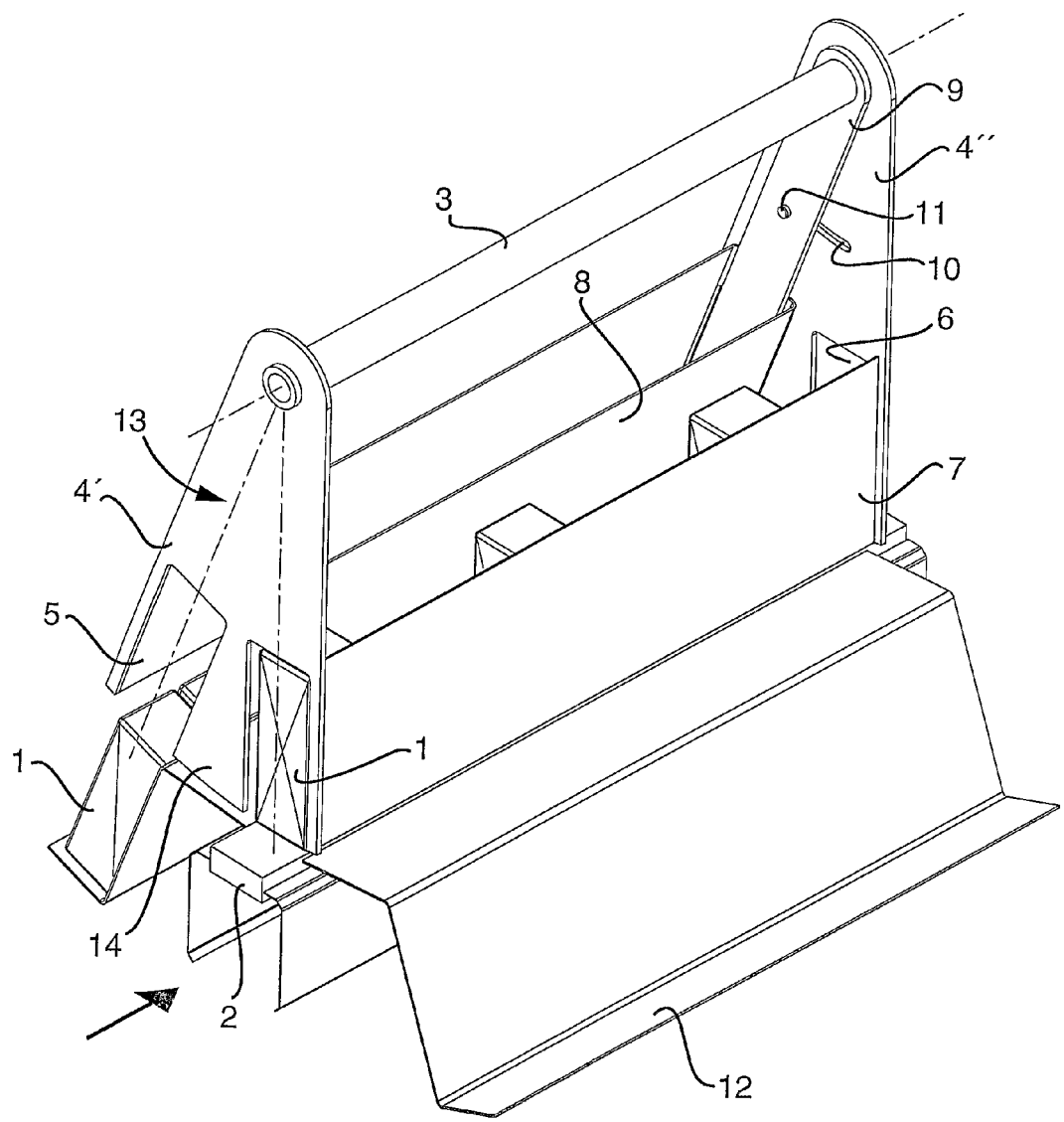
FIG. 3 is a perspective view of the apparatus according the invention.

The Drawings FIGS. 1 to 3 show an apparatus for removing a number of objects 1 from the row of objects 1 on a conveyor 2. The objects 1 may be single-use disposable packages which have just been filled with liquid contents in a filling machine and the intention is to remove a given number of packages in a given sequence. The apparatus is then preferably placed close to the filling machine.

On the production of dairy products and various juices, a certain number of packages are removed at a given time interval. In normal production, packages are removed as often as once every half hour. Most preferably, the intention is to take one package from each transverse sealing jaw in the filling machine. In modern filling machines, there are up to ten transverse sealing jaws mounted on a common chain in one and the same filling machine.

The apparatus according to the present invention may naturally be employed for removing other objects 1 and for other purposes where a rapid and reliable removal of objects is required.

FIG. 1 shows the apparatus as it is to be positioned above a conveyor 2 and where the apparatus is seen in the direction of movement of the conveyor 2. Parallel with the conveyor 2, the apparatus has a shaft 3. The shaft 3 is of a length which approximately corresponds to the total length of those objects 1 which are to be removed. The shaft 3 may possibly be telescopic or may be capable of changing its length by other means if another number of objects 1 needs to be removed.

At each end of the shaft 3, there is disposed an end wall 4. The end walls 4 are pivotal between two positions so that they may assume a position to the left of the conveyor 2 (FIG. 1) and a position to the right of the conveyor 2 (FIG. 2). These pivotal movements are realised by means of a pneumatic or alternatively hydraulic piston and cylinder arrangement (not shown), or alternatively by other means. Control may, for example, be put into effect from a filling machine, or the apparatus itself may be provided with its own control equipment.

At each end wall 4 there are provided two apertures which, in the front end wall 4' constitute two inlets 5 and in the rear end wall 4" constitute two outlets 6. Between one inlet 5 and one outlet 6 there are more or less continuous walls 7 so that two through flow channels 8 are formed parallel with the conveyor 2. The walls 7 may possibly be slidable or otherwise capable of changing in length if a different number of objects 1 needs to be removed.

The shaft 3, the end walls 4 and the through flow channels 8 together form a pivotal cradle 13 which is placed above the conveyor 2. The pivotal cradle 13 is suitably fixed on a frame (not shown). The frame may be secured in the conveyor 2, or alternatively be free-standing.

In immediate association with the rear end wall 4", there is disposed a stop 9. The stop 9 is secured in the shaft 3 and is pivotal between two positions. A guide groove 10 is possibly provided in the rear end wall 4", and a guide stub shaft 11 moves in the guide groove 10. The guide stub shaft 11 is secured on the stop 9 and it ensures that the stop 9 moves exactly and reliably between the two positions. The two positions coincide with the outlets 6 of the through flow channels 8. The pivotal movement is realised by means of a pneumatic, or alternatively hydraulic piston and cylinder arrangement (not shown), or alternatively by other means.

Further, the apparatus according to the invention includes supports 12 for the objects 1 removed from the conveyor 2. In the preferred embodiment, there is provided a support 12 on each side of the conveyor 2. The supports 12 are suitably secured in the conveyor 2. The supports 12 are of a length which at least corresponds to the total length of the removed objects 1. The supports 12 are designed so that they retain the objects 1 in a reliable manner, and they are positioned so that the removed objects 1 do not impede the movement of the pivotal cradle 13 between the two positions.

When it is desired to remove a number of objects 1 from a long row of objects advanced on a conveyor 2, the apparatus according to the invention may be in such a position as is illustrated in FIG. 1. One of the through flow channels 8 is placed centrally of the conveyor 2 and the objects 1 may move unimpeded in through the inlet 5, along the channel 8 and out through the outlet 6. The stop 9 is placed ahead of the second through flow channel 8 which is located to the left outside the conveyor 2.

When it is time for the removal of objects 1, the "correct" objects have possibly been identified with the aid of photocells (not shown), or the objects 1 which are to be removed have been determined by other means. The apparatus now receives a signal to pivot in the stop 9 ahead of that outlet 6 which is located centrally of the conveyor 2. The conveyor 2 fills the through flow channel 8 until the correct number of objects 1 is in place, i.e. the entire length of the through flow channel 8 is filled with objects 1.

Thereafter, the cradle 13 pivots to its second position, in the described case to the right. Those objects 1 which have been entrapped in the through flow channel 8 slide out of the channel and down on the support 12. The stop 9 remains in position ahead of this through flow channel 8 and accompanies the apparatus to the right. At the same time, the empty through flow channel 8 moves in over the conveyor 2 and the remaining objects 1 on the conveyor 2 may once again move through the apparatus.

When the pivotal movement is carried out, the remaining objects 1 are stopped on the conveyor 2 fleetingly by the end wall surface 14 between the two inlets 5. Since the pivotal movement takes place very rapidly and the cradle 13 need not carry out any return movement, the tailback pressure for subsequent objects 1 on the conveyor 2 will be extremely moderate. Consequently, there is no risk that the objects 1, for instance in the form of single-use disposable packages, are pinched and deformed. The pivotal movement proper takes less than one second and the apparatus may, therefore, be employed for purposes where a conveyor conveys up to 20,000 objects 1 per hour.

The apparatus according to the invention is now ready, when desired, once again to stop the objects 1 on the conveyor 2 in that the stop 9 moves in ahead of the conveyor 2. The above-described cycle of events is repeated, now to the left, and the apparatus has once again removed a number of objects 1 from the conveyor 2.

As will have been apparent from the foregoing description, the present invention realises an apparatus for the removal of objects advanced on a conveyor. The pivotal cradle moves rapidly and exactly between two positions and the fact that it need not execute any return movement means that the apparatus may be employed, for example, for modern filling machines with high output capacity. The apparatus according to the invention is also simple and economical to manufacture, with few moving parts.

The invention claimed is:

1. An apparatus for removing objects advanced on a conveyor, the apparatus comprising a part of a conveyor on which the objects are advanced, as well as supports for receiving the objects removed from the conveyor, a cradle pivotal over the conveyor with two through flow channels each with an inlet and an outlet, as well as a stop pivotal between outlets of the two through flow channels.

2. The apparatus as claimed in claim 1, wherein the pivotal cradle is pivotal between two positions; and the cradle is, after removal of the objects, disposed so that it does not execute a return movement.

3. The apparatus as claimed in claim 1, wherein the pivotal cradle is journalled in a shaft.

4. The apparatus as claimed in claim 1, wherein the pivotal cradle is of a length which corresponds to the total length of those objects which are to be removed.

5. The apparatus as claimed in claim 4, wherein the pivotal cradle is disposed to be changed in length depending upon the total length of those objects which are to be removed.

6. The apparatus as claimed in claim 1, wherein the movement of the pivotal cradle is realised by a pneumatic piston and cylinder assembly.

7. The apparatus as claimed in claim 1, wherein the movement of the stop is realised by a pneumatic piston and cylinder assembly.

8. The apparatus as claimed in claim 1, wherein the stop is provided with a guide stub shaft which moves in a guide groove provided in a rear end wall of the pivotal cradle.

* * * * *